(No Model.)

J. D. JOLLEY.
NUT LOCK.

No. 477,941. Patented June 28, 1892.

Witnesses:
Harry S. Rohrer
Mark D. Brainard

Inventor:
Jefferson D. Jolley,
by W. H. Lanum
Attorney.

THE NORRIS PETERS CO., PHOTO-LITHO., WASHINGTON, D. C.

UNITED STATES PATENT OFFICE.

JEFFERSON D. JOLLEY, OF WARRENTON, VIRGINIA, ASSIGNOR OF ONE-HALF TO WILLIAM H. SELDEN, OF WASHINGTON, DISTRICT OF COLUMBIA.

NUT-LOCK.

SPECIFICATION forming part of Letters Patent No. 477,941, dated June 28, 1892.

Application filed June 25, 1890. Serial No. 356,601. (No model.)

*To all whom it may concern:*

Be it known that I, JEFFERSON D. JOLLEY, a citizen of the United States, residing at Warrenton, in the county of Fauquier and State of Virginia, have invented certain new and useful Improvements in Nut-Locks; and I do hereby declare the following to be a full, clear, and exact description of the invention, such as will enable others skilled in the art to which it appertains to make and use the same.

My invention is in nut-locks of the class known as "base-washer" nut-locks; and it has the same object as other devices of that class—the convenient and effective locking of nuts upon their bolts in general and upon the bolts in rail-joints in particular.

The invention is fully illustrated in the accompanying drawings, in which—

Figure 1:
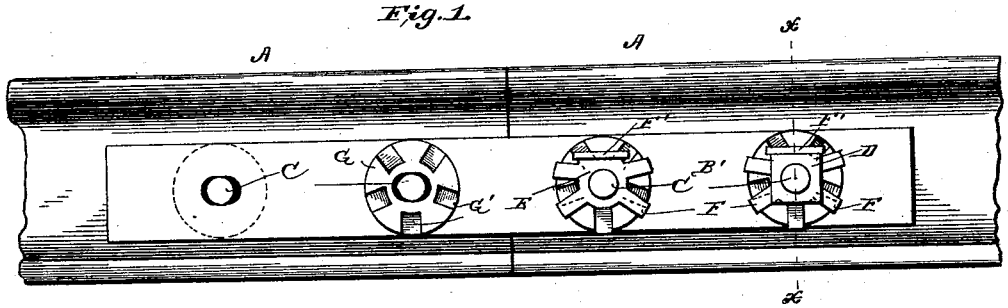
Figure 2:
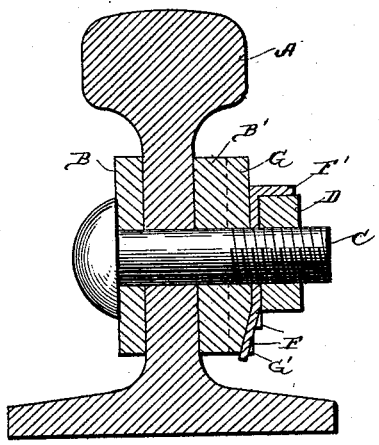
Figure 3:
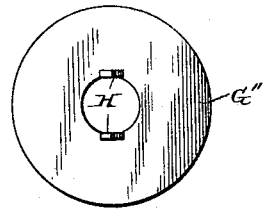

Figure 1 is a side view of a rail-joint provided with my devices, the nut being locked in position upon one bolt, removed alone from the second, removed with the washer in the third, and removed with the washer and a certain boss from the fourth bolt in order to illustrate a modified construction. Fig. 2 is a section on the line x x, Fig. 1. Fig. 3 shows the inner face of a washer that replaces the boss in the modification above suggested.

In the figures, A A are two meeting rails, B B' are fish-plates, C C bolts, and D D nuts thereon, all being of usual form, except the fish-plate B', which, indeed, may also be of common form if the modified construction is used, as will appear hereinafter.

E is a flat washer circular in general outline and provided with short radial arms F in its own plane and with a broader arm F'', bent outward into the path of the angles of the nut to insure simultaneous rotation of nut and washer. The arms F are preferably evenly spaced, or make equal angles with each other. Beneath the washer is a boss G, preferably integral with the fish-plate, of a less diameter than the washer, (including its arms,) and having in its outer face a series of depressions G' of a depth less than the thickness of the boss and whose angular separation is not the same as that of the arms F, but preferably a little greater. From this arrangement it follows that when the nut is screwed home some one of the arms will be exactly or very nearly coincident with some one of the depressions. With the construction illustrated the rotation necessary to secure this coincidence is never more than one-half the difference in the angular divergence of the arms and the depressions. When coincidence, is secured one of the arms is bent into the registering depression and the nut is locked. Since the diameter of the boss is less than that of the washer, arms included, the arms project beyond the boss, and as the depth of the depressions is less than the thickness of the boss the ends of the arms when bent to locking position are slightly separated from the general surface of the fish-plate. The bent arm may therefore be readily caught by the end of a crow or the like and bent outward to release the nut. So far as locking is concerned, the depressions might be in the body of the fish-plate; but in such case unlocking would be difficult. It is also evident that the boss need be integral with the fish-plate only to prevent its rotation. It may therefore be a washer G'', having the same outer face as before, if means be provided for preventing rotation—for example, the lugs H, Fig. 3, adapted to enter the oval bolt-hole at the sides of the bolt. When this washer is used, the device is well adapted for use upon woodwork; but since in such use the lugs force their own way into the wood their location is not necessarily near the central opening.

What I claim as new, and desire to secure by Letters Patent, is—

1. The combination, with a fish-plate having a series of depressions about each bolt-hole, of a washer having an arm bent into the plane of the nut resting against the washer and a series of arms adapted to be bent into said depressions, said depressions and said arms being differently spaced in angular distance from each other, substantially as set forth.

2. The combination, with the fish-plate having the bosses surrounding the bolt-holes and provided with the radial depressions, of the washer having radial arms spaced differently from said depressions and adapted to be bent into them, and, further, having the arm bent into the path of the angles of a nut resting upon the washer in the usual manner.

3. The combination, with the fish-plate having the bosses about the bolt-holes and the radial depressions in the bosses of a depth less than the thickness of the latter, of the washers having radial arms projecting beyond the bosses and an arm in the path of the angles of a nut placed upon a bolt passing through the washer, said arms differing in angular spacing from the depressions and being adapted for bending into the latter, substantially as set forth.

In testimony whereof I affix my signature in presence of two witnesses.

JEFFERSON D. JOLLEY.

Witnesses:
ROBERT O. ST. CLAIR,
WILLIAM F. FOLLEN.